United States Patent [19]

Laugs et al.

[11] Patent Number: 4,746,281

[45] Date of Patent: May 24, 1988

[54] APPARATUS FOR RENDERING THE CABLE CORE OF A TELECOMMUNICATION CABLE LONGITUDINALLY WATER-TIGHT

[75] Inventors: Johannis A. B. M. Laugs, Gouda; Johannes N. M. Van Leeuwen, Nuenen; Hillebrand J. J. Kraakman, Geldrop, all of Netherlands

[73] Assignee: N.K.F. Groep B.V., Rijswijk, Netherlands

[21] Appl. No.: 822,998

[22] Filed: Jan. 27, 1986

[30] Foreign Application Priority Data

Jan. 28, 1985 [NL] Netherlands .......................... 8500221
Dec. 9, 1985 [NL] Netherlands .......................... 8503381

[51] Int. Cl.[4] ........................ B29C 45/07; B29C 45/20

[52] U.S. Cl. ................................ 425/113; 425/376 B; 425/381

[58] Field of Search ............... 425/376 R, 376 B, 381, 425/130, 131.1, 113; 264/174, 177.16; 156/244.13; 118/320, 325, 405

[56] References Cited

U.S. PATENT DOCUMENTS

| | | | |
|---|---|---|---|
| 4,172,106 | 10/1979 | Lewis | 425/381 X |
| 4,181,486 | 1/1980 | Saito | 425/113 |
| 4,397,624 | 8/1983 | Haverkamp et al. | 425/113 |
| 4,455,133 | 6/1984 | Jakob et al. | 425/381 X |
| 4,595,546 | 6/1986 | Wheeler, Jr. | 425/376 B |

*Primary Examiner*—Donald E. Czaja
*Assistant Examiner*—Ramon Hoch
*Attorney, Agent, or Firm*—Cushman, Darby & Cushman

[57] ABSTRACT

For rendering the cable core of a telecommunication cable longitudinally water-tight, a sealing material is applied in plugs and at regular distances in and around the cable core (C) moved at a constant speed, by means of an injection head (43) which can be displaced in a reciprocating movement in the longitudinal direction of the cable core (C); the sealing material is injected by means of a rotating injection nipple (47) in a single continuous jet rotating in a radial plane around the cable core (C) (FIG. 4).

6 Claims, 8 Drawing Sheets

APPARATUS FOR RENDERING THE CABLE CORE OF A TELECOMMUNICATION CABLE LONGITUDINALLY WATER-TIGHT

BACKGROUND OF THE INVENTION

The invention relates to a method of rendering the cable core of a telecommunication cable longitudinally water-tight, a method according to which a sealing material is applied in plugs and at regular distances in and around the cable core consisting of stranded conductors and moved at a constant speed, by means of an injection head, which can be displaced intermittently and synchronously with the movement of the cable core in the longitudinal direction of the cable core.

For making a cable longitudinally water-tight, the hollow spaces in the cable core are divided longitudinally of the core into watertight compartments of the same length by plugs of sealing material slightly adhering both to the conductors of the cable core as well as to the sheath and/or envelope surrounding the cable core. The division of the hollow spaces in the cable core into water-tight compartments serves to prevent, in the case of damage of the cable sheath, moisture which may penetrate into the cable core from migrating further along the conductors in the longitudinal direction of the cable and from spreading throughout the cable. If penetrated water is not prevented from spreading, the electrical properties of the cable, such as capacitance and cross-talk, can be considerably reduced. Furthermore, the penetrated water can attach the individual conductors electrolytically via small holes in the insulation referred to as pin-holes. Moreover, there is a risk that water which has penetrated as far as the connection sleeves may cause short circuits between individual transmission networks.

For the sealing material a rubber-like mass known from U.S. Pat. No. 4,451,692 may be used, which during injection under pressure is liquid and after elimination of the pressure is viscous, in other words, has a high yieldpoint stress and a comparatively low viscosity and which cures in due course.

A method of the kind set forth is known from U.S. Pat. No. 4,397,624. In this method, the sealing material is fed from a pressure vessel and pressed via an annular pressure gap radially into the cable core. Due to the fact that the sealing material is only at a comparatively low pressure, the method is limited to cable cores having a diameter of about 25 mm at most. The comparatively low filling speed of the sealing material of about 70 m/sec results in a comparatively long filling time of about 10 s per cycle. In practice, the sealing plugs have a length of 20 to 30 cm. This method is further limited to cable cores having about 200 conductors at most and to cores the individual conductors of which have a diameter not exceeding about 1,8 mm. By means of this method, a maximum production speed, i.e. travelling speed, of the cable core of 0.2 to 0.2 m/s can be attained, dependent upon the diameter of the cable core and upon the number of conductors.

Within the said limits, the known method is satisfactory in practice. Due to the fact, however, that in this method the sealing material is pressed into the cable core along its entire circumference, there is moreover a risk, especially with regard to cable cores of larger diameters, of the conductors being compressed and the core being constricted so that the sealing mass cannot penetrate into the heart of the cable core.

SUMMARY OF THE INVENTION

The objects of the invention are to obviate the above-noted limitations and to provide a method which permits the making of a larger series of cable cores both as to the composition and as to the diameter longitudinally water-tight in an efficient and economical manner and of simultaneously increasing the maximum possible production speed.

According to the invention, these objectives are mainly achieved in that the sealing material is injected in jets from different successive radial directions at a high speed onto and into the cable core.

With the method according to the invention, the sealing material is not pressed, but injected into the cable core. Due to the high kinetic energy of the sealing material, the individual conductors are pushed apart and openings are formed so that a quick penetration, a large penetration depth and a good distribution of the sealing material, in other words, a complete and homogeneous filling, are obtained over a given length of the cable core. High speeds are to be understood to mean herein jet velocities of about 100 m/sec and higher. There is no longer a risk of the cable core being constricted. Due to the quick penetration, the injection time per sealing plug can be reduced to tenths of a second; the production speed can be increased by about a factor 10; the length of a sealing plug can be reduced by a factor 2 to 3, which also means a corresponding saving of sealing material. Moreover, by the method, cable cores having conductors with a diameter in the range of 0.6 to 5.0 mm can be made longitudinally water-tight. The conductors may be provided either with a foam insulation or with a solid insulation.

The sealing material may be injected, for example, in a number of successive separate jets distributed over the circumference of the cable core into the cable core. For producting these separate jets, a comparatively large number, for example 20, of small pumps or injectors could be arranged along the circumference of the cable cores in order to successively inject the desired quantity of sealing material into the cable core.

However, in a preferred embodiment of the method according to the invention, the sealing material is injected in a single continuous jet rotating in a radial plane around the cable core. When the sealing material is injected in a single continuous jet, the homogeneity and the filling are favourably influenced and the parameters, such as pressure and jet velocity, are controlled more accurately, as a result of which the process can be carried out in a reliable and reproducible manner. Of course the jet moves during rotation synchronously with the cable core in the travelling direction thereof. Per injection cycle, the jet performs a complete revolution. Experiments have shown that by means of the method according to the invention cable core having a diameter up to 45 mm and comprising 600 conductors can be treated at a jet velocity of 200 m/s, at a filling time of 0.1 and at a production speed of 1.0 m/s. The speed of rotation of the jet was 10 r/s. The length of the sealing plugs amounted to 10 to 15 cm.

A telecommunication cable, the cable core of which has been rendered longitudinally water-tight by means of the method according to the invention, is characterized by discrete plugs of sealing material applied at regular distances in and on the cable core. When the cable core is cut through at the level of a sealing plug, the presence of the sealing material can be ascertained and it can be checked that the sealing material has penetrated into the heart of the cable core. The method is suitable for making longitudinally water-tight many cable types, such as cables comprising stranded conductors, cables whose conductors are provided with a foam insulation or with a solid insulation, coaxial cables, glass fibre cables, and the like.

The invention further relates to an apparatus for carrying out the method according to the invention comprising an injection head displaceable in a reciprocating movement, guiding means for the invention head and a driving means for the reciprocating displacements of the injection head, said injection head having a housing with a cylindrical passage chamber and an injection nipple connected to a feed system for supplying sealing material; according to the invention, this apparatus is characterized in that the injection nipple is rotatably journalled in the housing of the injection head and is provided with a single injection orifice. Due to the characterized constructional measures, a comparatively simple compact and low-disturbance construction is obtained.

In a preferred embodiment of the apparatus according to the invention, the feed system comprises a supply vessel, a metering pump, a back-pressure valve, a three-way valve between the metering pump on the one hand and the supply vessel and the back-pressure valve on the other hand, and a pressure amplifier which is connected through a shut-off valve and a pressure conduit to the injection head. The metering pump meters the correct quantity of the sealing material which is supplied from the supply vessel and leads this quantity via the back-pressure valve to the pressure amplifier, which acts as a high-pressure pump. In the pressure amplifier, the sealing material can be pressurized to a pressure of up to $6 \cdot 10^4$ kPa. When now the shut-off valve is opened, the pressurized material is supplied via the pressure conduit to the injection head and is injected via the injection orifice at a high speed into the cable core. The fairly high static pressure of the sealing material in the pressure conduit is converted in the injection orifice substantially completely into dynamic pressure except inevitable losses, such as conversion losses, frictional losses and the like, which are converted into heat according to the formula of Bernouilli:

$$p_t = p_{st} + \tfrac{1}{2}\rho v^2(1+\xi),$$

in which $p_t$=overall pressure in Pa $p_{st}$=static pressure in Pa v=speed in m/s $\rho$=density in kg/m$^3$, while $\xi$ is a loss factor. The term $\frac{1}{2}\rho v^2$ indicates the dynamic pressure. The sealing material is injected at a high speed exclusively in purely radial direction and without producing an axial speed component through the outer layer of the cable core at least into the heart of the cable core in such a manner that reconversion of the dynamic pressure into static pressure takes place in the cable core. The sealing material is not pressed, but injected into the cable core. Due to the high dynamic pressure, in other words, the high kinetic energy of the sealing material, the individual conductors are pushed apart and openings are formed so that a large penetration depth and a good distribution of the sealing material as well as a complete and homogeneous filling of the cable core are obtained.

Due to the fact that the conversion of static pressure into dynamic pressure takes place in the injection orifice, i.e. in the injection head, the sealing material is injected substantially without further losses directly into the cable core. Due to the fact that the sealing material downstream of the injection orifice is not subjected to static pressure, the passage chamber in the injection head is without pressure so that it need not be sealed and can have comparatively large dimensions. This further means that the cable core to be treated can pass through the passage chamber without any contact and that the same injection head is suitable for filling cable cores of different diameters lying within a given range of diameters. In view of the absence of sealing members subjected to wear and susceptible to disturbances, such as sealing nipples and sealing sleeves, such parts need not be exchanged either when the apparatus is adjusted to other cable types within a given range of diameters. This in contrast with the apparatus known from U.S. Pat. No. 4,397,624 and EP Patent Application No. 0047341, in which upon adjustment to a cable type having a different diameter, parts have to be exchanged indeed.

The apparatus described thus far is only suitable for filling a cable core with a sealing material comprising a single component. A preferred embodiment of the apparatus according to the invention, which is particularly suitable for processing sealing material composed of two components, is characterized by a second supply vessel, a second metering pump and a second three-way valve, the two metering pumps and the two three-way valves being coupled to each other and a mixer being arranged between the three-way valves and the back-pressure valve. The two supply vessels each contain one of two components. The two components are supplied by the metering pumps in a given ratio and in given quantities to the mixer, preferably a stationary mixer. After mixing, the curing process is started. With the use of the aforementioned sealing material, which is curing at room temperature, the sealing material has to be processed within about four hours. However, this does not give rise to difficulties because the two components are mixed only a short time before their injection. The complete curing process requires about 48 hours. After a production cycle, sealing material left in the apparatus is removed by flushing the mixer and the injection head with one of the two components.

A further preferred embodiment of the apparatus according to the invention is characterized in that the injection orifice has a length:diameter ratio of 3:10. Experiments have shown that the dimensions of the injection orifice have to be chosen carefully. An injected orifice having too short a length would lead to a spread of the injection jet involving the risk of insufficient penetration of the injection jet into the cable core. An injection orifice having too great a length would lead to excessively high conversion losses. It has been found that with a length of the injection opening of 0.15 to 1.0 mm depending upon the cable type and taking into account the characterized length:diameter ratio, satisfactory results are obtained for practically all cable types used in practice. During the experiments, the maximum jet velocity was limited to 200 m/s because at higher velocities conductors insulated with foam of synthetic material can be damaged.

In another preferred embodiment of the apparatus according to the invention, the injection head comprises for rotation of the injection nipple a motor having a rotor and a stator, the rotor being coupled to the injection nipple. Due to these measures, a very compact construction for the rotation of the injection nipple is obtained; especially the possibility is provided for rotating the injection nipple during the reciprocating movement of the injection head in a compaaratively simple manner. Preferably, the motor is constructed as a hydraulic or pneumatic motor.

A clearance-free and low-friction rotation of the injection nipple is obtained in a further preferred embodiment of the apparatus according to the invention in that the rotor of the motor is journalled in the housing of the injection head by means of a hydrostatic or pneumostatic bearing.

BRIEF DESCRIPTION OF THE DRAWINGS

The invention will be described more fully with reference to the drawing. In the drawing.

Figure 1:
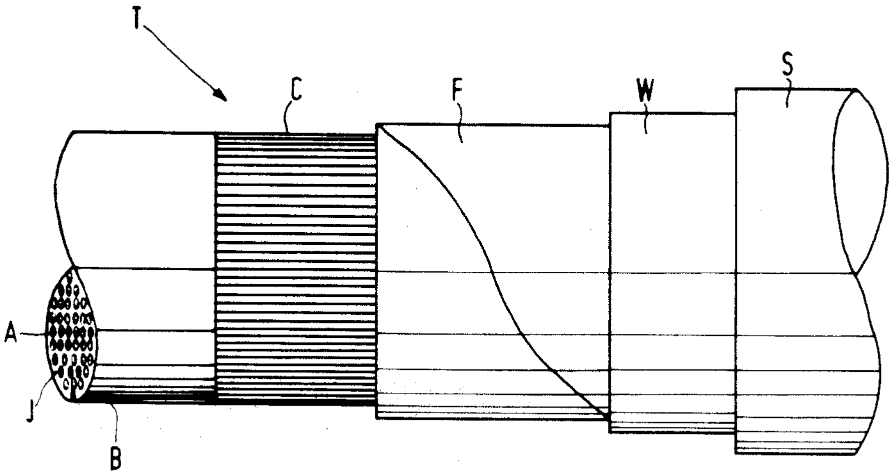
FIG. 1 is a side elevation of an end of a telecommunication cable having a longitudinally water-tight cable core.
Figure 2:
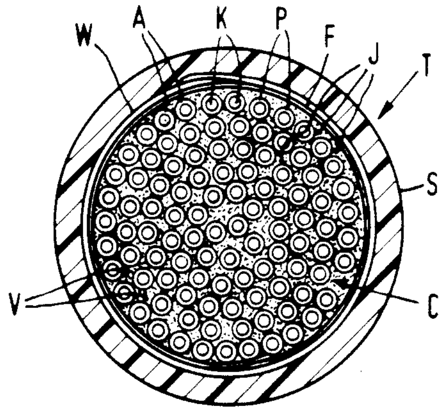
FIG. 2 shows in cross-section the cable shown in FIG. 1.

The embodiment of a telecommunication cable T shown in FIGS. 1 and 2 mainly consists of a cable core C around which is wrapped or folded a foil F, for example, of water-proof synthetic material or the like; the foil F is surrounded by a water-tight envelope W consisting of an aluminium tape provided with a layer of synthetic material; ultimately a sheath S of synthetic material is extruded onto the envelope W.

If such a telecommunication cable has to be laid in earth, an armouring (not shown) generally consisting of two wrapped layers of steel tape and an outer sheath of polyethylene can be provided on the sheath S. The cable core C is composed of conductors A consisting of a copper wire K provided with an insulation sheath P of synthetic material, such as polyethylene. The conductors A are stranded pairwise to form pairs which are then stranded, as the case may be via units, to the cable core C. During the assembly of the cable core, free spaces and voids V are formed between the conductors and the stranded pairs. In order to make the cabale core longitudinally water-tight, these voids and spaces V are filled with a sealing mass J, which is injected at regular distances into the cable core in such a manner that discrete sealing plugs B are formed.

The cable described is given only by way of example. Many alternative different cable types, which differ both as to construction and as to materials, are generally known and can also be rendered longitudinally watertight by means of the method according to the invention.

Figure 3:
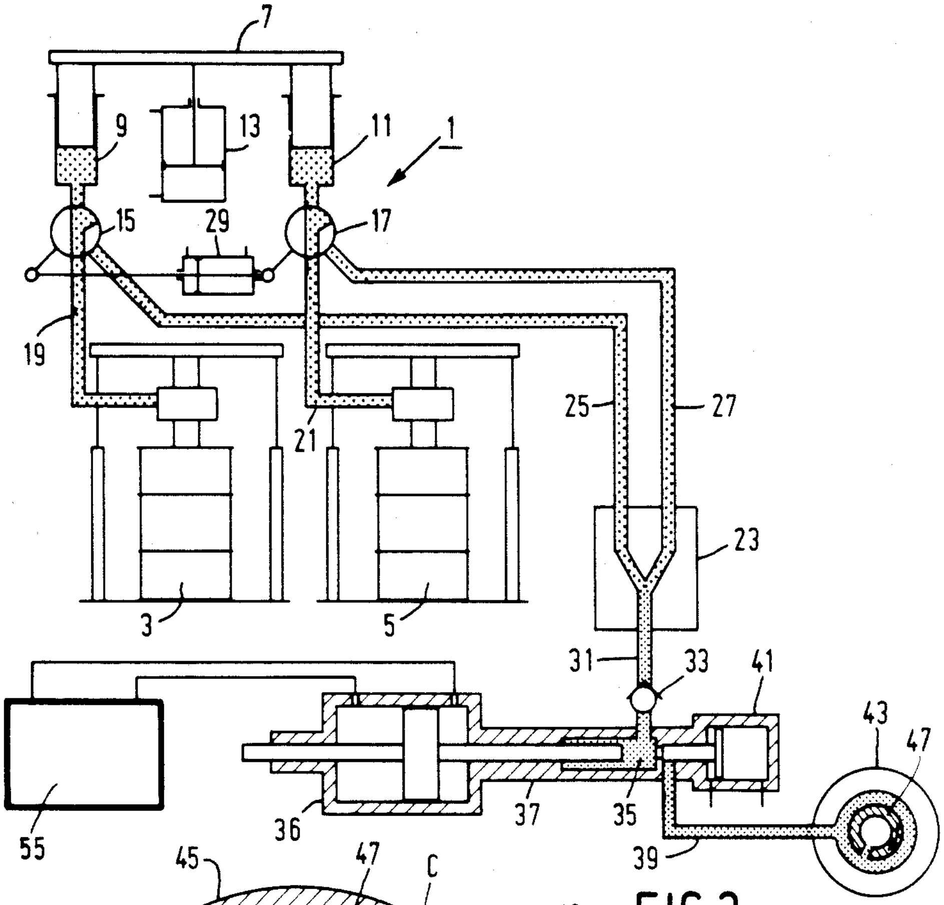
FIG. 3 shows diagrammatically an apparatus for rendering the cable longitudinally water-tight.

FIG. 3 shows diagrammatically an apparatus for rendering a cable core longitudinally water-tight, in which as sealing means a sealing material composed of two components is injected into the cable core. The apparatus 1 comprises two supply vessels 3 and 5 each provided with a built-in pump (not shown). Reference numeral 7 denotes a double metering pump with cylinders 9 and 11, which is driven by a pneumatic unit 13. The cylinders 9 and 11 are periodically connected via three-way valves 15 and 17 either to the supply vessels 3 and 5 through supply conduits 19 and 21 or to a stationary mixer 23 through metering conduits 25 and 27. The two three-way valves are driven together and synchronously with the metering pump 7 by a hydraulic unit 29. The mixer 23 is connected by means of a low-pressure conduit 31 via a back-pressure valve 33 to the pressure cylinder 35 of a pressure amplifier 37, which is driven by a hydraulic unit 36 and is constructed as a plunger pump. Via a pressure conduit 39, which is controlled by a shut-off valve 41, the pressure amplifier 37 can be connected to an injection head 43. The shut-off valve 41 is operated hydraulically. An injection head 43 is displaceable in known manner in a reciprocating movement in the longitudinal direction of the cable core on a guide. In this movement, the injection head 43 can be driven pneumatically or hydraulically. Such a drive and guide is known from the aforementioned U.S. Pat. No. 4,397,624.

Figure 4:
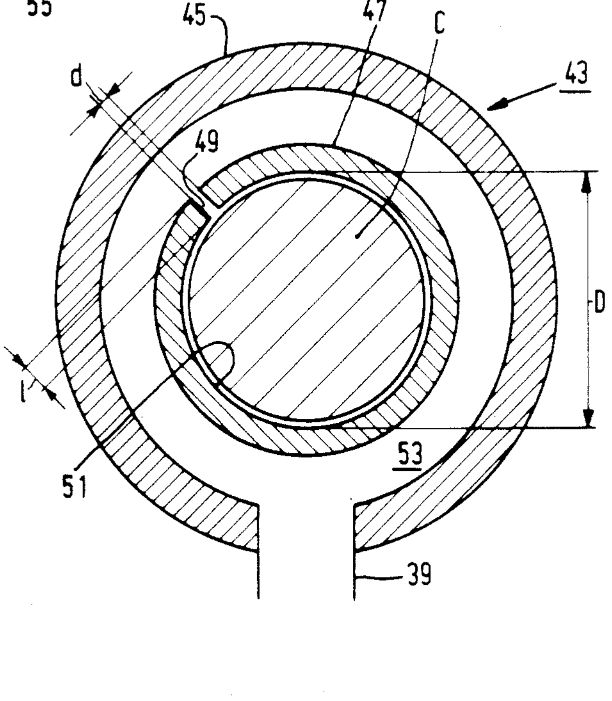
FIG. 4 shows diagrammatically in cross-section the injection head according to the invention.
Figure 5:
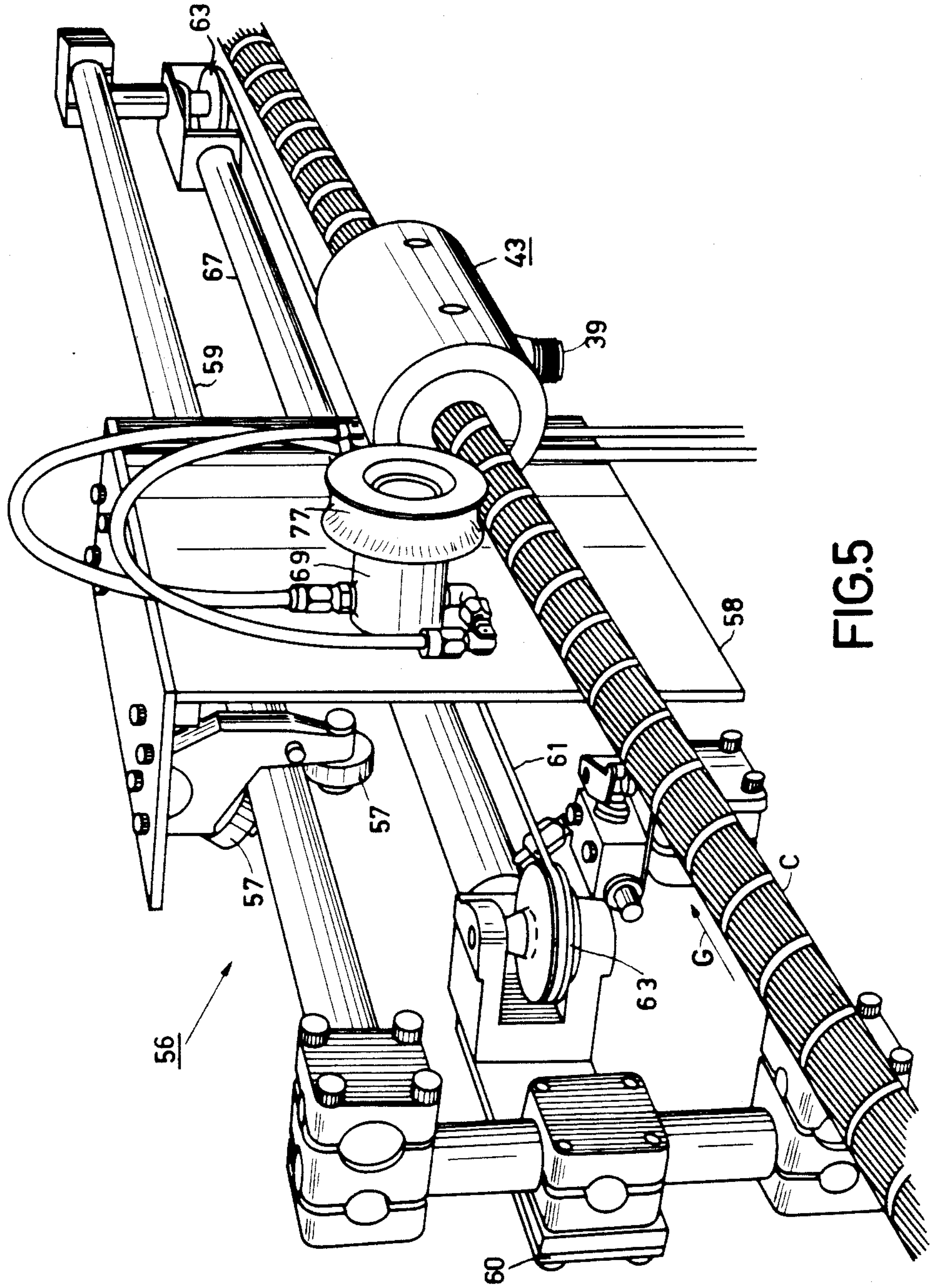
FIG. 5 is a perspective view of a practical embodiment of the injection device.
Figure 6:
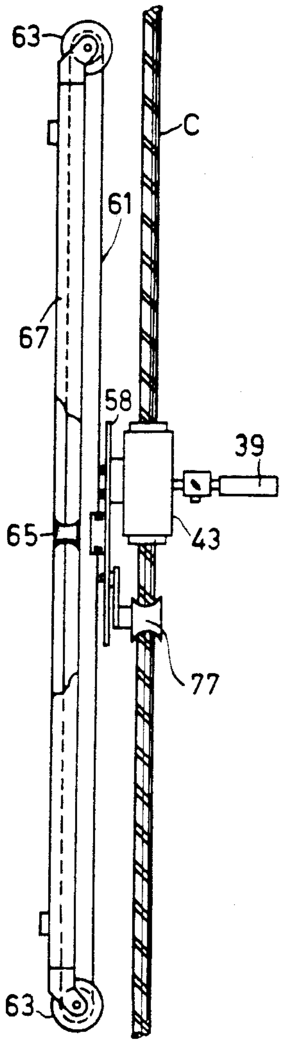
FIG. 6 shows in plan view on a reduced scale the injection device shown in FIG. 5, FIGS. 7 and 8 show in cross-section and in side elevation, respectively, a part of the device.

As shown diagrammatically in FIG. 4, the injection head 43 comprises a housing 45 with a rotatable injection nipple 47 provided with a single injection orifice 49 which merges into a central cylindrical passage chamber 51, through which a cable core C to be treated is passed. The injection orifice 49 communicates via an annular groove 53 with the pressure conduit 39. For the rotation of the injection nipple 47, the injection head 43 has a motor to be more fully described hereafter comprising a rotor and a stator, the rotor being coupled to the injection nipple 47. The rotor is journalled by means of a hydrostatic or pneumostatic bearing in the housing 45 of the injection head 43. The pneumatic and hydraulic units 13, 29, 36 and 41, respectively, are controlled via a programmable control unit 55. The two supply vessels 3 and 5 each contain one of the two components of a sealing material composed of two components. Both components may consist, for example, of silicone rubber. A catalyst is added to one component, while a cross-linking agent and, as the case may be, a pigment are added to the other component.

An injection cycle is effected as follows: both components are pumped from the supply vessels 3 and 5 by the built-in pumps to the cylinders 9 and 11 of the metering pump 7, the two three-way valves 15 and 17 being in the filling position. After the cylinders 9 and 11 have been filled with a predetermined quantity of the two components, the two three-way valves 15 and 17 are brought into the other position, which is the metering position and the two components are driven at a comparatively low pressure through the metering conduits 25 and 27 to the mixer 23.

In the mixer 23, the two components are mixed, after which the curing process is started. The driving unit 36 of the pressure amplifier is without pressure and the shut-off valve 41 is in the shut-off position, in which the pressure conduit 19 is shut off. Due to the excess pressure of the sealing material in the low-pressure conduit 31 caused by the metering pump 10, the back-pressure valve 33 is opened and the cylinder 35 of the pressure amplifier 37 is filled up to a pre-adjusted stroke volume. After a starting signal, the injection head 43 is displaced in the travelling direction of the cable core and synchronously with the travelling speed of the cable core and the injection nipple 47 is set into rotation. Subsequently, the shut-off valve 41 is opened, as a result of which the sealing material is injected into the cable core C through the injection opening 49 at a high speed in a single continuous jet. After termination of the injection stroke of the pressure amplifier 37, the shut-off valve 41 is shut, the rotation of the injection nipple 47 is stopped and the injection heaad 43 is reset to the starting position. The pressure amplifier 37 is depressurized again by resetting the unit 36 with the plunger to the starting position. The apparatus 1 is ready for a next injection cycle. The cycle is driven by the programmable control unit 55, which receives the necessary information from the pressure, way and temperature sensors (not shown) included in the system.

The units 13, 29, 41 and 36 are constructed partly pneumatically and partly hydraulically. It will be appreciated that in this connection pneumatic, hydraulic as well as electrical constructions are considered to be equivalent and that the said units may be constructed hydraulically, pneumatically or electrically; the operation is essentially not changed thereby.

Figure 9:
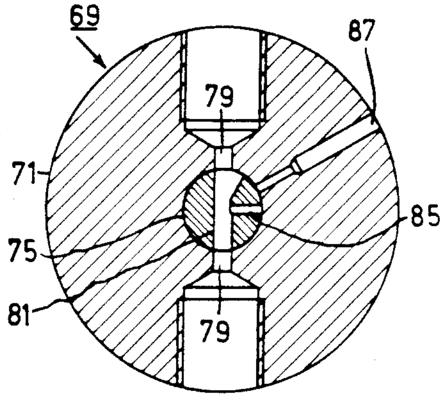
FIGS. 9 and 10 show in cross-section a throttling valve in the rest position and in the vent position, respectively.
Figure 10:
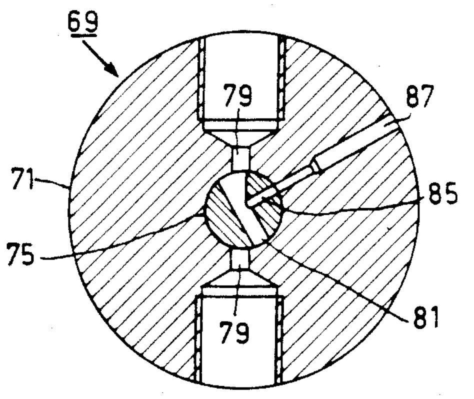
Figure 7:
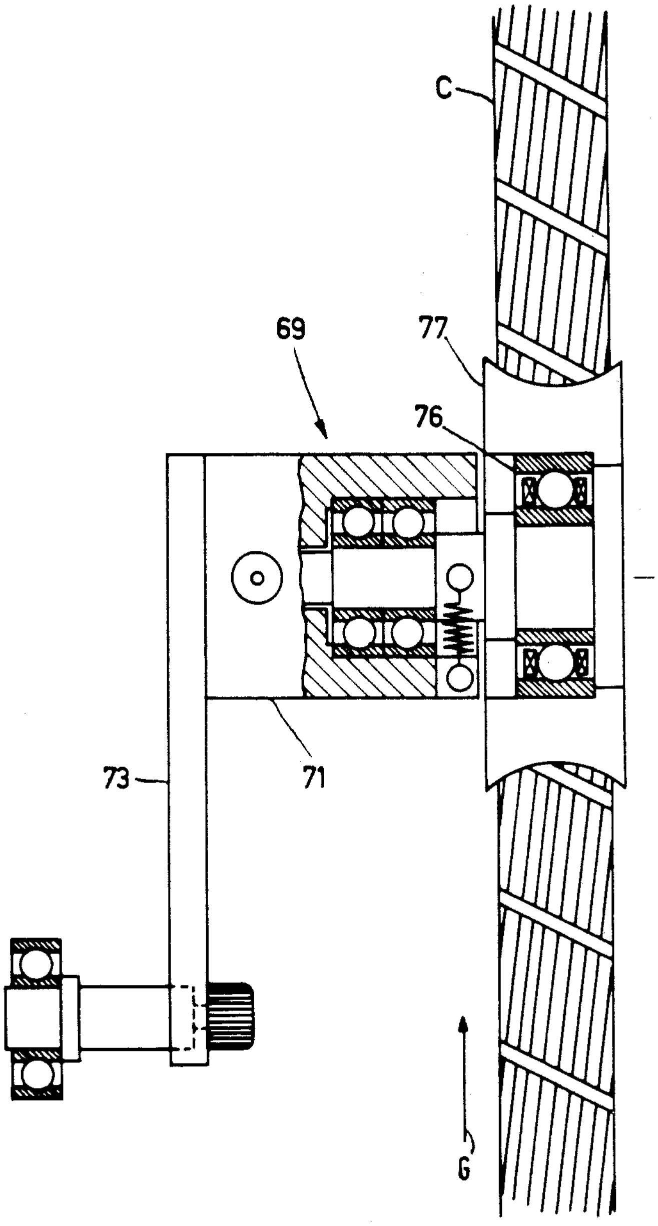
Figure 8:
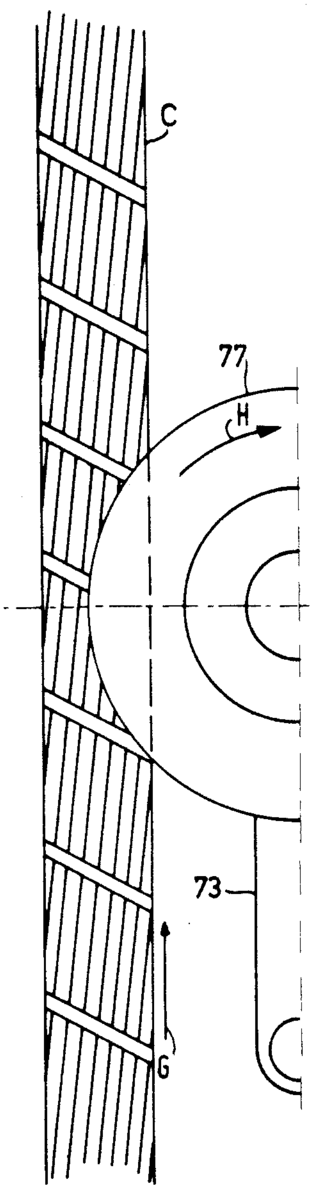

FIGS. 5 to 10 show a practical embodiment of the apparatus according to the invention. This apparatus 56 comprises a carriage 58, on which the injection head 43 is secured and which is journalled by means of rollers 57 on guides 59 which form part of a frame 60 and extend parallel to the travelling direction G of the cable core C to be rendered water-tight. The carriage 58 is coupled by means of a rope or cable 61 guided over guide wheels 63 to the piston 65 of a pneumatic unit 67 secured on the frame. Reference numeral 69 designates a throttling valve comprising a housing 71 pivotably arranged via an arm 73 on the carriage 58. A cylindrical cock 75 is rotatably journalled in the housing 71. By means of a free-wheel bearing 76, a follower wheel 77 scanning the cable core C is journalled on a freely projecting part of the cock 75. The housing 71 and the cock 75 are provided with air ducts 79 and 81, respectively, the housing being connected on the one hand to a source of compressed air (not shown) and on the other hand to the pneumatic unit 67. By energization of an electromagnet valve from the control unit 55, compressed air can be supplied via the throttling valve 69 to the pneumatic unit. The housing 71 and the cock 75 are further provided with vent ducts 85 and 87, respectively. The operation of this apparatus is as follows: After a starting signal originating from the control unit 55, the pneumatic unit 67 is energized pneumatically a short time before the shut-off valve 41 is opened (FIG. 3), so that the injection head 43 is displaced by the piston 65 together with the follower wheel 77 at a pre-adjusted starting speed. This starting speed is chosen to be higher than the linear speed of the cable core C. Due to the speed difference thus occurring, the follower wheel 77 brings about a relative rotation of the cock 75 and of the housing 71. As a result, the supply of air to the pneumatic unit 67 by the throttling valve 69 is reduced unitl the speeds of the cable core C and the piston 65 are equal so that the speed of the injection head 43 is synchronized rapidly and substantially without delay with the speed of the cable core C. Variations of the speed of the cable core lead to an immediate control of the throttling valve 69, as a result of which the speed of the piston 65 is immediately adapted again to that of the cable core. Due to the vent ducts 85 and 87 in the throttling valve, overshoot of the piston 65 is prevented if the difference between the constant permanently adjusted starting speed of the piston 65 and the speed of the cable core is very great. The vent ducts 85 and 87 enable the pneumatic unit to be quickly vented temporarily so that the speed difference is very quickly eliminated. FIG. 9 shows the throttling valve 69 in the rest position which corresponds to the starting speed of the piston 65. FIG. 10 shows the throttling valve in the vent position in which the air supply is completely throttled. Between two injections, the follower wheel 77 rotates freely due to the free-wheel bearing 76 without influencing the throttling valve. The free-wheel direction of the follower wheel 77 is indicated in FIG. 8 by the arrow H. The travelling direction of the cable core C is indicated in the drawing by the arrow G.

Figure 11:
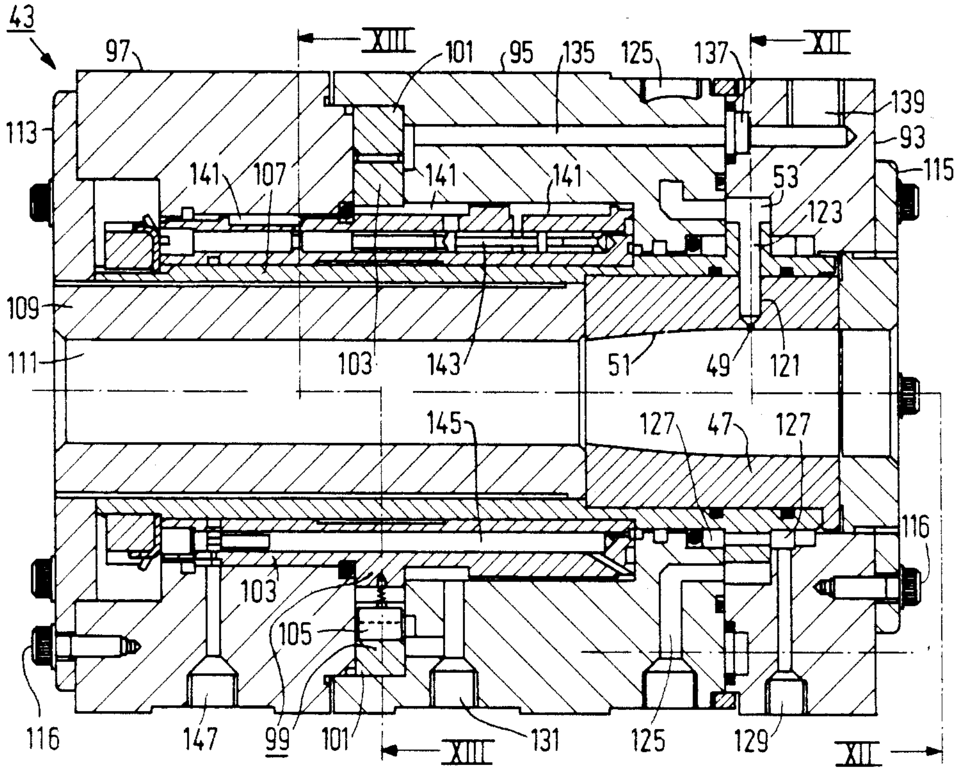
FIG. 11 is a longitudinal sectional view of a practical embodiment of the injection head.
Figure 13:
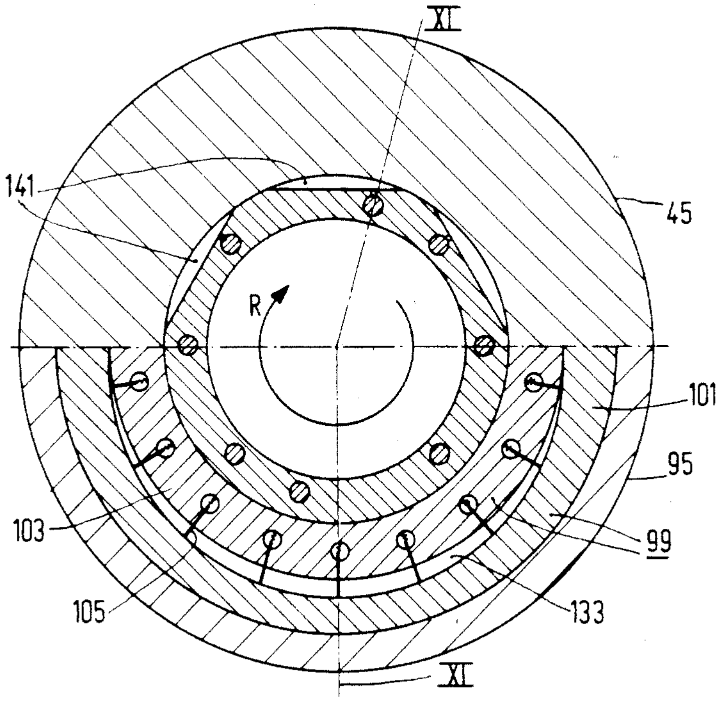
FIG. 13 shows the injection head in a cross-section taken on the line XIII—XIII of FIG. 11.
Figure 12:
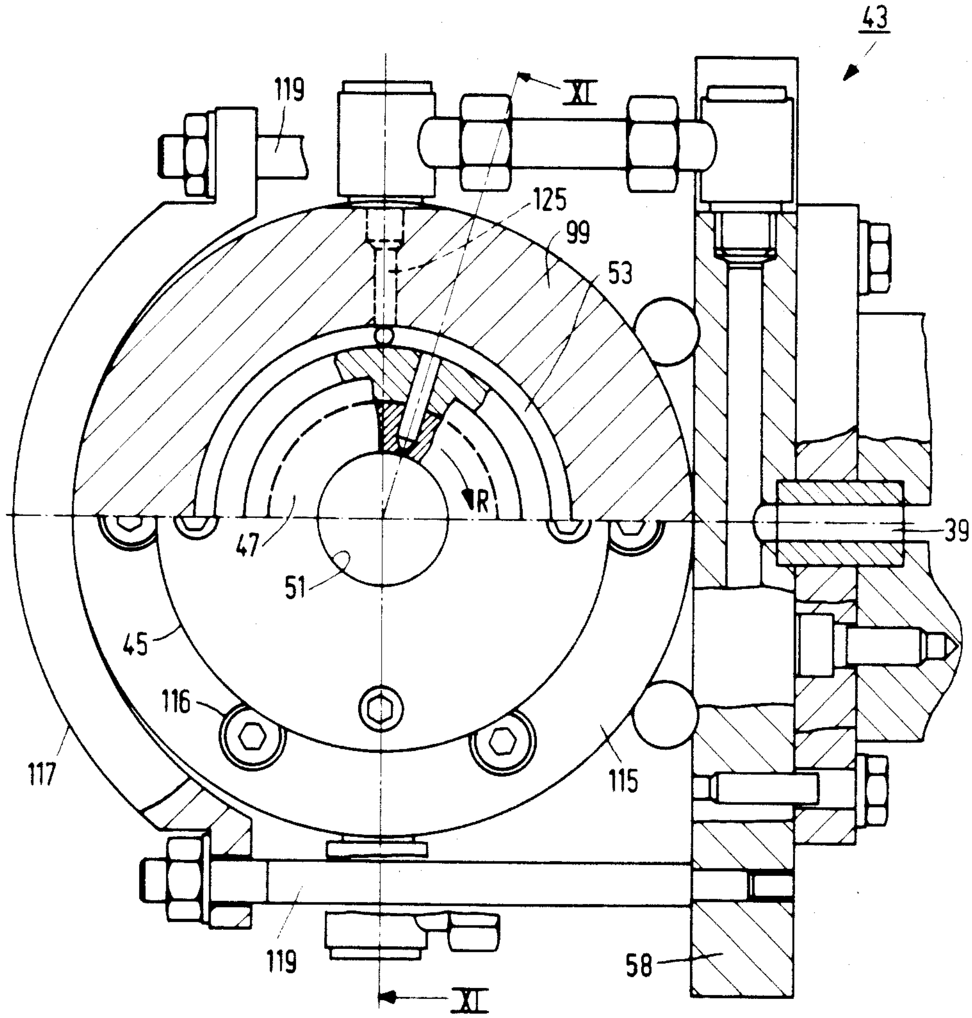
FIG. 12 shows the injection head partly in cross-section and partly in front elevation taken on the line XII--XX of FIG. 11.

The construction of the injection head 43 will be explained more fully with reference to FIGS. 11, 12 and 13. The housing 45 of the injection head 43 is composed of three hollow-cylindrical blocks, i.e. a nipple block 93, a central block 95 and an end block 97. In the embodiment shown, the injection head 43 is provided with a hydraulic motor and with a hydrostatic bearing.

The central block 95 accommodates the hydraulic motor 99 mainly consisting of a stator 101 and a rotor 103 provided with blades 105. The rotor 103 is fixed on a cylindrical sleeve 107, which accommodates the injection nipple 47. The sleeve 107 loosely surrounds a guide sleeve 109 which is aligned with the injection nipple 47 and is provided with a bore 111 which is aligned with the passage chamber 51 of the injection nipple 47. Since the guide sleeve 109 serves inter alia to guide and centre the cable to be treated, the diameter of the bore 111 is smaller than the diameter of the passage chamber 51.

At both ends the housing 45 is closed by flanges 113 and 115, which are secured by means of bolts 116 on the nipple block 93 and the end block 97.

By means of brackets 117 and bolts 119, the injection head 43 is fixed on the carriage 58. The injection opening 49 in the injection nipple 47 communicates via a duct 121 in the injection nipple and a duct 123 in the sleeve 107 with the aforementioned annular groove 53, which is connected via ducts 125 in the central block 95 to the pressure conduit 39 (FIG. 3). Annular chambers 127 and a leakage duct 129 in the nipple block 93 serve to drain sealing material leaked out. A supply duct 131 in the central block 95 serves to supply oil under pressure to the hydraulic motor 99, more particularly to the chambers 133 thereof. In FIG. 13, the oil is supplied to the lower righthand side of the motor 99 with a direction of rotation indicated by the arrow R. The expanded oil is drained via a return duct 135 in the central block 95 through an annular groove 137 and a return bore 139 in the nipple block 93. The rotor 103 of the hydraulic motor 99 is mounted in the central block 95 and the end block 97 by means of a hydrostatic bearing, of which the pressure chambers are denoted by reference numeral 141. Via a supply conduit (not shown), oil under pressure is supplied and is distributed in known manner via throttling members 143 provided with restrictions over the pressure chambers 141. Via an outlet duct 145 in the rotor 103 and an outlet bore 147 in the end block 97, the oil of the hydrostatic bearing is returned.

Figure 14:
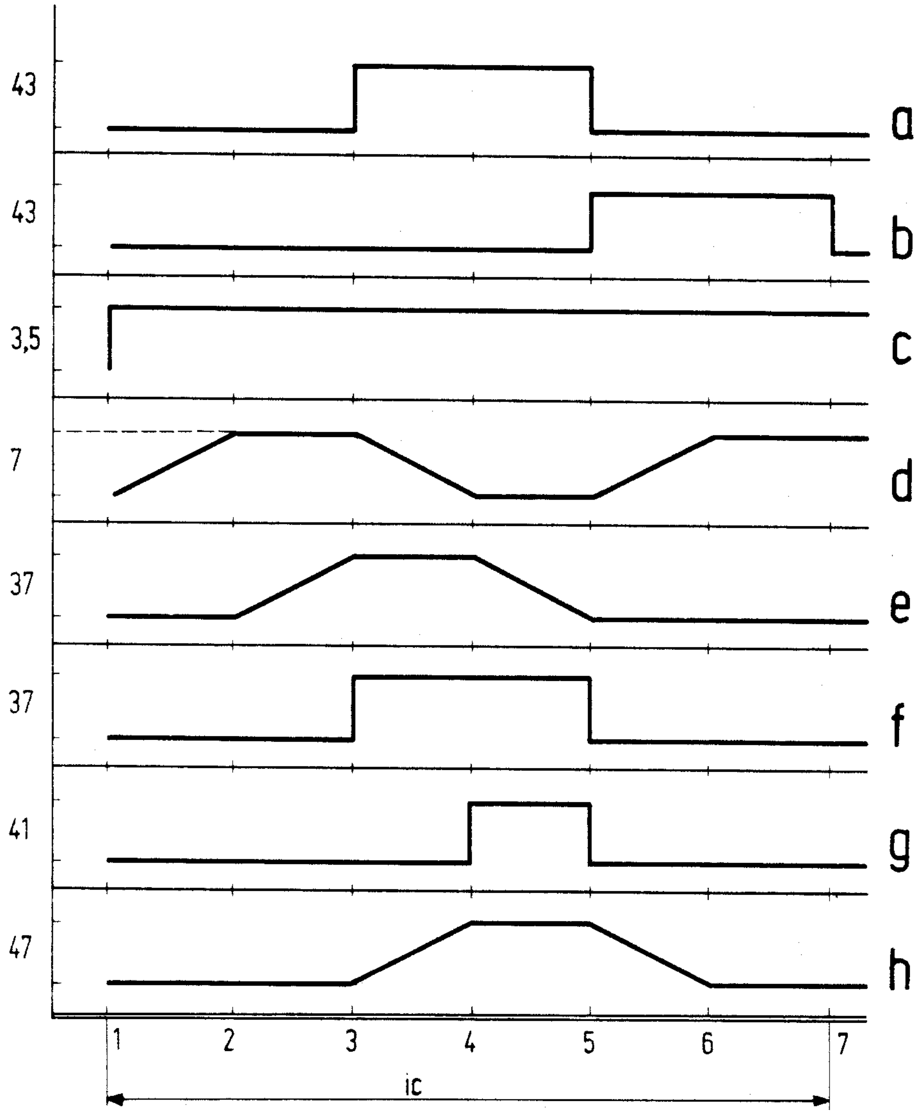
FIG. 14 shows the step condition diagram of an injection cycle.

Due to the hydrostatic bearing, the rotating parts of the injection head 43, especially the injection nipple 47, are journalled free of clearance and with low friction. The general operation of the hydraulic motor 99 is assumed to be known and will not be explained further. However, the hydraulic motor 99 is activated from the control unit 55, synchronously with the reciprocating movement of the injection head 43 and synchronously with the supply of sealing material via the pressure conduit 39. The oil flowing through the various ducts, bores and chambers of the injection head also ensures the cooling thereof. The step condition diagram shown in FIG. 14 illustrates the the situations and positions of the injection head 43, of the pumps of the supply vessels 3 and 5, of the metering pump 7, of the pressure amplifier 37, of the shut-off valve 41 and of the injection nipple 47. In FIG. 14 the lines a to h illustrate the operation, position and situation of the following elements:

a: injection stroke of injection head 43;
b: return stroke of injection head 43;
c: operation of pumps in vessels 3 and 5;
d: operation of metering pump 7;
e: filling degree of pressure amplifier 37;
f: pressure in pressure amplifier 37;
g: operation of shut-off valve 41;
h: rotation of injection nipple 47.

An injection cycle is shown in seven steps and proceeds as follows:

step 1: The apparatus is started by switching on the pumps in the vessels 3 and 5; the pumps continue to operate as long as the apparatus is operative (c); the three-way valves 15 and 17 are in the filling position; the metering pump 7 performs a filling stroke (d) and the two cylinders 9 and 11 are each filled with one of the two components of which the sealing material is composed.

step 2: The two cylinders 9 and 11 of the metering pump 7 are filled; the three-way valves 13 and 15 are set into the metering position; the metering pump 7 performs a metering stroke (d), as a result of which a prdetermined metered quantity of each component is fed to the mixer 23; after mixing in the mixer, the sealing material is supplied to the pressure amplifier 37 (e).

step 3: The injection head 43 is started and begins to perform the forward stroke (a); due to the synchronization by means of the follower wheel 77, the injection head very rapidly attains the desired speed; simultaneously, the rotation of the injection nipple 47 is started (h); the cylinders of the metering pump 7 are emptied (d), while the pressure amplifier 37 is filled completely (e) and is pressurized (f).

step 4: The injection head 43 continues the forward movement (a) and the injection nipple 47 has the full speed of rotation (h); the shut-off valve 41 is opened (g); by the pressure amplifier 37 which is under full pressure (f), the sealing material is injected under high pressure through the injection opening 49 in the injection nipple 47 into the cable core C; the cylinders of the metering pump 7 are empty (d); the pressure amplifier 37 is almost emptied (e).

step 5: The injection has taken place; the shut-off valve 41 is shut off again (g); the injection nipple 47 has performed during the injection one complete revolution and is stopped again (h); the injection head 43 has performed the forward stroke (a) and begins to perform the backward stroke (b); the cylinders of the metering pump 7 are being filled again (d); the pressure amplifier 37 is now empty (e) and is no longer under pressure (f).

step 6: The rotational movement of the injection nipple 47 has been stopped (h), while the backward stroke of the injection head 43 still continues (b); the cylinders of the metering pump 7 have been filled (e).

step 7: The injection head 43 now has also terminated the backward stroke and has been stopped (b). The apparatus is ready for a next cycle.

The units 13, 29, 41, 36 and 67 are constructed partly pneumatically and partly hydraulically. It will be appreciated that in this connection pneumatic, hydraulic as well as electric constructions are considered to be equivalent and that the said units may be constructed hydraulically, pneumatically as well as electrically; the operation of the apparatus is not changed essentially thereby.

In the embodiment shown, the injection head 43 is provided with a hydraulic motor for driving the injection nipple 47. However, the injection nipple may alternatively be driven by means of a pneumatic or electric motor.

What is claimed is:

1. An apparatus for rendering a cable core longitudinally water-tight comprising:
an injection head having a housing with a cylindrical passage chamber and an injection nipple with an injection orifice radially directed to the cable, wherein said injection nipple is rotatably journalled in the housing of the injection head and wherein said injection head is displaceable in a reciprocating movement,
means for guiding the injection head,
means for providing the reciprocating displacement of the injection head, and
means for supplying a sealing material to the injection nipple so that the sealing material is intermittently injected at a velocity of about 100 m/s or greater into the cable core.

2. The apparatus as claimed in claim 1 wherein the injection orifice has a length:diameter ratio of 3:10.

3. The apparatus as claimed in claim 1 wherein the injection head comprises, for the rotation of the injection nipple, a motor with a rotor and a stator, the rotor being coupled to the injection nipple.

4. The apparatus as claimed in claim 3 wherein the rotor of the motor is journalled in the housing of the injection head by means of a hydrostatic or pneumostatic bearing.

5. The apparatus according to claim 1 wherein said supplying means comprises:
a supply vessel,
a metering pump,
a back-pressure valve,
a three-way valve between said metering pump, said supply vessel, and said back-pressure valve, and
a pressure amplifier which is connected via a shut-off valve and a pressure conduit to said injection head.

6. The apparatus as claimed in claim 5 further comprising:
a second supply vessel,
a second metering pump, and
a second three-way valve, wherein the two metering pumps and the two three-way valves are coupled to each other with a mixer being arranged between the three-way valves and the back-pressure valve.

* * * * *